United States Patent
Piper et al.

(10) Patent No.: US 8,746,217 B2
(45) Date of Patent: Jun. 10, 2014

(54) POWER SYSTEM COMPRISING AN AIR COOLED HT EGR COOLER AND LT EGR COOLER

(75) Inventors: Erik L. Piper, Cedar Falls, IA (US); Alan D. Sheidler, Moline, IL (US); Craig W. Lohmann, Denver, IA (US)

(73) Assignee: Deere & Company, Moline, IL (US)

( * ) Notice: Subject to any disclaimer, the term of this patent is extended or adjusted under 35 U.S.C. 154(b) by 306 days.

(21) Appl. No.: 13/268,212

(22) Filed: Oct. 7, 2011

(65) Prior Publication Data

US 2013/0087127 A1    Apr. 11, 2013

(51) Int. Cl.
F02B 47/08    (2006.01)
F04B 47/10    (2006.01)

(52) U.S. Cl.
USPC ..................................... 123/568.12; 701/108

(58) Field of Classification Search
USPC .................. 123/568.12, 568.15, 568.11, 542, 123/559.1, 562, 563, 564, 41.56; 701/108; 60/278, 279, 605.1, 605.2, 598, 599, 60/612

See application file for complete search history.

(56) References Cited

U.S. PATENT DOCUMENTS

| | | | |
|---|---|---|---|
| 6,003,315 A | 12/1999 | Bailey | |
| 6,216,458 B1 | 4/2001 | Alger et al. | |
| 6,244,256 B1 | 6/2001 | Wall et al. | |
| 6,918,251 B2 | 7/2005 | Yanagisawa et al. | |
| 7,165,540 B2 | 1/2007 | Brookshire et al. | |
| 7,715,976 B1 | 5/2010 | Xiao et al. | |
| 2005/0021218 A1 | 1/2005 | Bhargava et al. | |
| 2005/0066659 A1* | 3/2005 | Super et al. | 60/605.2 |
| 2005/0199229 A1* | 9/2005 | Eitel et al. | 123/568.12 |
| 2006/0037590 A1 | 2/2006 | Uzkan et al. | |
| 2006/0179824 A1 | 8/2006 | Roser | |
| 2006/0248888 A1 | 11/2006 | Geskes | |
| 2007/0028902 A1 | 2/2007 | Nigoro et al. | |
| 2007/0039321 A1 | 2/2007 | Sheidler et al. | |
| 2007/0204614 A1 | 9/2007 | Kolb | |
| 2007/0261400 A1 | 11/2007 | Digele et al. | |

(Continued)

FOREIGN PATENT DOCUMENTS

DE    20080048133 A1    4/2010
EP    1840365 A1    10/2007

(Continued)

OTHER PUBLICATIONS

GEA Exhaust Gas Recirculation Cooler, Reliable Emission Reduction for the Future. GEA Heat Exchangers. Heme. Germany. 6 pages.

(Continued)

Primary Examiner — Mahmoud Gimie

(57) ABSTRACT

Disclosed is a power system comprising an internal combustion engine. A fan is associated with the engine and configured for providing an air flow. The power system further comprises an EGR system having an air cooled, HT EGR cooler configured for cooling recirculated exhaust gas, wherein the HT EGR cooler is positioned downstream of the internal combustion engine. The HT EGR cooler is further positioned such that the air flow travels across the outside of the HT EGR cooler. The EGR system further comprises an air cooled, LT EGR cooler is configured for further cooling at least a portion of the recirculated exhaust gas, wherein the LT EGR cooler is positioned downstream of the HT EGR cooler. The LT EGR cooler is further positioned such that the air flow travels across the outside of the LT EGR cooler.

9 Claims, 2 Drawing Sheets

(56) References Cited

U.S. PATENT DOCUMENTS

| | | |
|---|---|---|
| 2008/0053090 A1 | 3/2008 | Kardos et al. |
| 2008/0135028 A1 | 6/2008 | Kardos et al. |
| 2009/0173071 A1 | 7/2009 | Kapich |
| 2009/0217660 A1* | 9/2009 | Ranini et al. .................... 60/599 |
| 2009/0260605 A1* | 10/2009 | Janssen et al. ........... 123/568.12 |
| 2009/0277428 A1 | 11/2009 | Marsh et al. |
| 2009/0277429 A1* | 11/2009 | Marsh et al. ............. 123/568.12 |
| 2009/0277430 A1* | 11/2009 | Ernst et al. ............... 123/568.12 |
| 2009/0314266 A1 | 12/2009 | Hori et al. |
| 2009/0320467 A1 | 12/2009 | Kardos et al. |
| 2011/0094486 A1* | 4/2011 | Vuk ......................... 123/568.21 |

FOREIGN PATENT DOCUMENTS

| | | |
|---|---|---|
| GB | 2421590 A | 6/2006 |
| WO | 2005083244 A1 | 9/2005 |
| WO | 20070055644 A1 | 5/2007 |
| WO | 20080066472 A1 | 6/2008 |
| WO | 20090002233 A1 | 12/2008 |
| WO | 20090064242 A1 | 5/2009 |
| WO | 2010005347 | 1/2010 |

OTHER PUBLICATIONS

European Search Report dated Feb. 5, 2013 (8 pages).
European Search Report dated Sep. 18, 2013 (14 pages).

* cited by examiner

POWER SYSTEM COMPRISING AN AIR COOLED HT EGR COOLER AND LT EGR COOLER

FIELD OF THE DISCLOSURE

The present disclosure relates to a power system. More specifically, the present disclosure relates to a power system comprising an air cooled, high temperature EGR cooler and an air cooled, low temperature EGR cooler.

BACKGROUND OF THE DISCLOSURE

A power system may comprise an internal combustion engine and an exhaust gas recirculation system (EGR system). The EGR system recirculates a portion of the engine's exhaust gas back into the engine's intake manifold. The recirculated exhaust gas that is recirculated reduces the concentration of oxygen therein, which then lowers the combustion temperature, slows the chemical reactions, and decreases the formation of nitrous oxides (NOx). Increased EGR rates of up to 50% may be necessary for meeting Tier 4 emissions standards. At such high rates, tremendous amounts of recirculated exhaust gas enter the intake manifold and increase the intake manifold temperature. The rising intake manifold temperature—as the result of what may be referred to as "warm EGR"—adversely affects the engine's power and emissions reduction potential.

Past power systems have used liquid cooled EGR coolers for cooling the "warm EGR," rather than using ambient air. However, the use of liquid cooled EGR coolers is disadvantageous. The use of liquid cooled EGR coolers is inefficient, because heat transfers, from the "warm EGR," to the engine coolant, and then the heat transfers, from the engine coolant, to ambient air. So, for example, if the engine coolant is at 95° C. and the ambient air is at 30° C., there is a small temperature differential of only 65° C. With such a small temperature differential, a tremendous amount of fan power is necessary for removing the heat from the "warm EGR." This difficulty arises, because the temperature differential is the driving force for transferring heat.

A further problem associated with EGR coolers is the formation of condensation within themselves.

What is needed is a power system that cools the "warm EGR" without the use of liquid engine coolant, and with only minimal amounts of fan power. What is further needed is a power system that prevents the formation of condensation within the EGR coolers.

SUMMARY OF THE DISCLOSURE

Disclosed is a power system comprising an internal combustion engine, wherein the engine receives intake gas and produces exhaust gas, wherein a portion of the exhaust gas becomes recirculated exhaust gas. The power system further comprises a fan associated with the engine and configured for providing an air flow.

The power system also comprises an EGR system having an air cooled, high temperature exhaust gas recirculation cooler (HT EGR cooler) configured for cooling the recirculated exhaust gas. The HT EGR cooler is positioned downstream of the engine, and the HT EGR cooler has an inside and an outside. The inside of the HT EGR cooler is configured for receiving the recirculated exhaust gas, and the HT EGR cooler is positioned such that the air flow travels across the outside of the HT EGR cooler.

Still further, the exhaust gas recirculation system comprises an air cooled, low temperature exhaust gas recirculation cooler (LT EGR cooler) configured for further cooling at least a portion of the recirculated exhaust gas. The LT EGR cooler is positioned downstream of the HT EGR cooler. The LT EGR cooler has an inside and an outside. The inside of the LT EGR cooler is configured for receiving the portion of the recirculated exhaust gas, and the LT EGR cooler is positioned such that the air flow travels across the outside of the LT EGR cooler.

Using the disclosed air cooled EGR coolers—the HT EGR cooler and the LT EGR cooler—if, for example, the "warm EGR" entering the HT EGR cooler is at 600° C. and the ambient air is at 30° C., there is a huge temperature differential of 570° C. Here, the heat transfers directly from the "warm EGR" to the ambient air, and with such a temperature differential, little fan power is necessary for removing heat.

BRIEF DESCRIPTION OF THE DRAWING

The detailed description of the drawings refers to the accompanying figures in which.

DETAILED DESCRIPTION OF THE DRAWINGS

Figure 1:
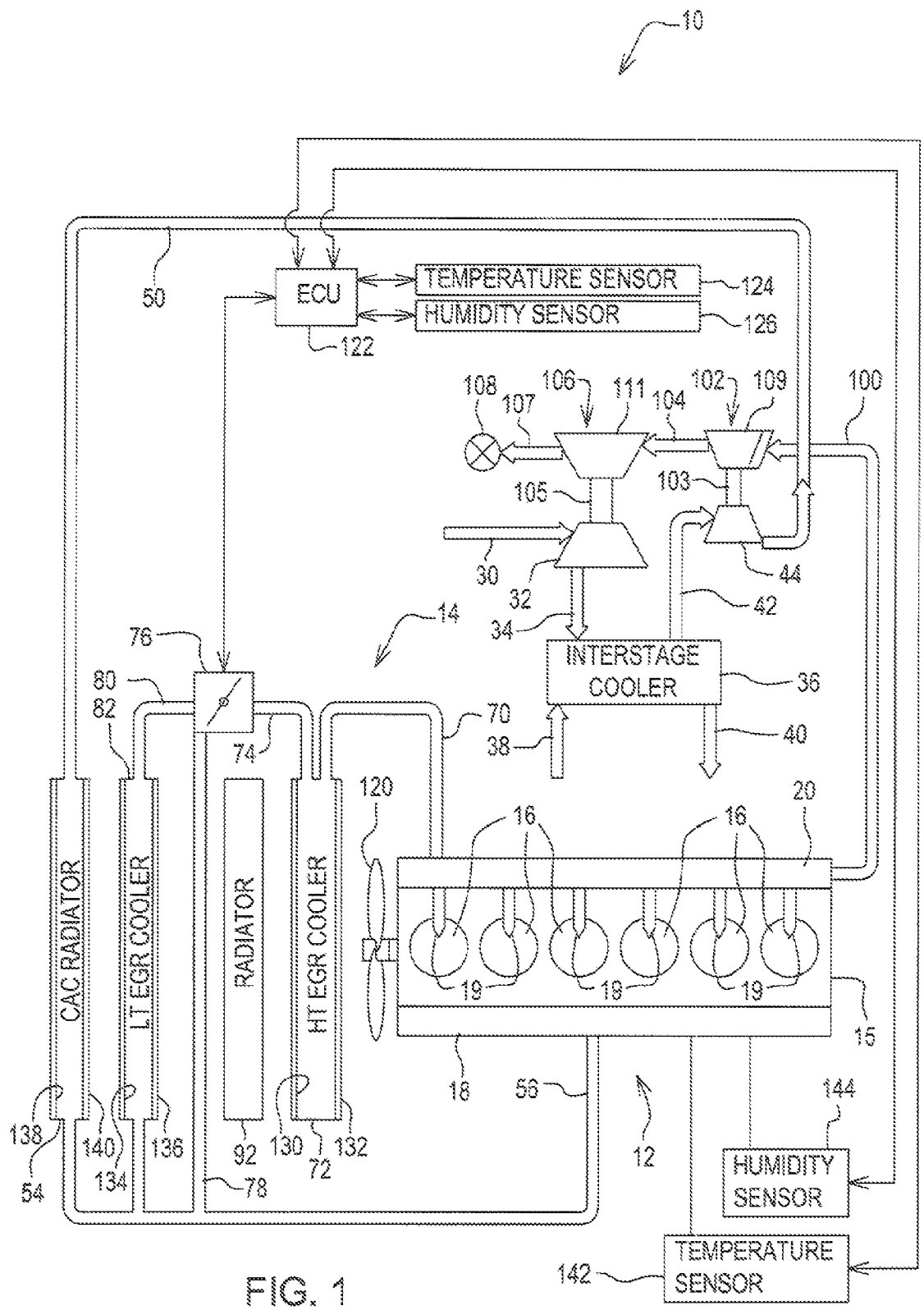
FIG. 1 is a simplified schematic diagram of a first power system.

Referring to FIG. 1, there is shown a simplified schematic diagram of a first power system 10. The power system 10 comprises an internal combustion engine 12, wherein the engine 12 receives intake gas and produces exhaust gas. A portion of the exhaust gas becomes recirculated exhaust gas. The power system 10 further comprises a fan 120 associated with the engine 12 and is configured for providing an air flow. Exemplarily, the engine 12 may drive the fan 120, or alternatively an electric motor (not shown) may drive the fan 120.

The engine 12 further comprises an engine block 15, an intake manifold 18, an exhaust manifold 20, and a plurality of injectors 19. The engine block 15 is an integrated structure comprising one or more cylinders 16. The cylinders 16 are round holes having some depth and configured for receiving pistons (not shown). The intake manifold 18 supplies the intake air to the cylinders 16.

Prior to the intake manifold 18, the power system 10 may further comprise a variable geometry turbocharger (VGT) 102 having a compressor 44 and a turbine 109. Still further, the power system 10 may comprise a fixed turbocharger 106 having a compressor 32 and a turbine 111 positioned upstream of the VGT 102. The intake gas may enter the compressor 32 via an ambient air inlet 30 and, then, be compressed. Further, the power system 10 may comprise an interstage cooler 36 connected to the fixed turbocharger 106 via line 34 and, further, connected to the VGT 102 via line 42. The interstage cooler 36 may be liquid cooled via, for example, a liquid engine coolant that enters the interstage cooler 36 via a line 38 and exits via a line 40. After the intake gas passes through the interstage cooler 36, the compressor 44 compresses the intake gas even further.

The power system 10 may further comprise a charge air cooler radiator (CAC radiator) 54 configured for cooling the intake gas again. The CAC radiator 54 may be positioned downstream of the VGT 102, and may be connected to the VGT 102 via a line 50. The CAC radiator 54 has an inside, 138 and an outside 140. The inside 138 of the CAC radiator 54 is configured for receiving the intake gas, and the CAC radiator 54 is positioned such that the air flow travels across the outside 140 of the CAC radiator 54. The CAC radiator 54, the LT EGR cooler 82, and the bypass line 78 may all be connected to the intake manifold 18 via an intake line 56. As such, the intake gas mixes with the recirculated exhaust gas, and they then enter the intake manifold 18 and cylinders 16.

Next, the exhaust manifold 20 collects the exhaust gas from the cylinders 16. The exhaust gas, from the exhaust manifold 20, may enter an exhaust gas recirculation system (EGR system) 14 via an exhaust gas recirculation line 70. The exhaust gas that enters the EGR system 14 may be referred to as recirculated exhaust gas. In contrast, the exhaust gas that enters line 100 enters the turbine 109, which causes the shaft 103 and the compressor 44 to rotate. Next, the exhaust gas enters a line 104 and the turbine 111, which forces shaft 105 and compressor 32 to rotate. Finally, the exhaust gas exits the power system 10 via a line 107 an exhaust port 108.

The EGR system 14 further comprises an air cooled, HT EGR cooler 72. The recirculated exhaust gas enters the EGR line 70 and, then, the HT EGR cooler 72, which is configured for cooling the recirculated exhaust gas. The HT EGR cooler 72 is positioned downstream of the engine 12, and the HT EGR cooler 72 has an inside 130 and an outside 132. The inside 130 of the HT EGR cooler 72 is configured for receiving the recirculated exhaust gas, and the HT EGR cooler 72 is positioned such that the air flow travels across the outside 132 of the HT EGR cooler 72.

Still further, the EGR system 14 comprises an air cooled, LT EGR cooler 82 configured for further cooling at least a portion of the recirculated exhaust gas. The LT EGR cooler 82 is positioned downstream of the HT EGR cooler 72. The LT EGR cooler 82 has an inside 134 and an outside 136. The inside 134 of the LT EGR cooler 82 is configured for receiving the portion of the recirculated exhaust gas, and the LT EGR cooler 82 is positioned such that the air flow travels across the outside 136 of the LT EGR cooler 82.

The EGR system 14 may also comprise a bypass valve 76 positioned between the HT EGR cooler 72 and the LT EGR cooler 82. The HT EGR cooler 72 may be connected to the bypass valve 76 via line 74, and the LT EGR cooler 82 may be connected to the bypass valve 76 via a line 80. The bypass valve 76 may be a bypass valve, or the bypass valve 76 may be a combination of a bypass valve and an EGR valve. If the bypass valve 76 is a bypass valve only, then the EGR valve may be, placed before or after the bypass valve 76. The power system 10 may have also comprised a bypass line 78 connected to the bypass valve 76. The bypass valve 76 and the bypass line 78 cooperate for allowing at least some of the recirculated exhaust as to bypass, at times, the LT EGR cooler 82. By allowing at least some of the recirculated exhaust gas to bypass the LT EGR cooler 82, the amount of condensation formed in the LT EGR cooler 82 is minimized or even eliminated.

The EGR system 14 may further comprise an electronic control unit (ECU) 122, a first humidity sensor 126, and a first temperature sensor 124. The first temperature sensor 124 may be configured for providing a signal to the ECU 122 indicative of the temperature of the ambient air. The first humidity sensor 126 may be configured for providing a signal to the ECU 122 indicative of the humidity of the ambient air. The ECU 122 may be configured for controlling the bypass valve 76 and minimizing the condensation formation, in the LT EGR cooler 82, in response to the signals provided by the first temperature sensor 124 and the first humidity sensor 126.

In addition, the EGR system 14 may comprise a second temperature sensor 142 configured for providing a signal to the ECU 122 indicative of the temperature of the intake gas in the intake manifold 18. Still further, the EGR system 14 may comprise a second humidity sensor 144 configured for providing a signal to the ECU 122 indicative of the humidity of the intake gas in the intake manifold 18. The ECU 122 may be configured for controlling the bypass valve 76 and minimizing the condensation formation, in the LT EGR cooler 82, in response to the signals provided by the second temperature sensor 142 and the second humidity sensor 144.

Figure 2:
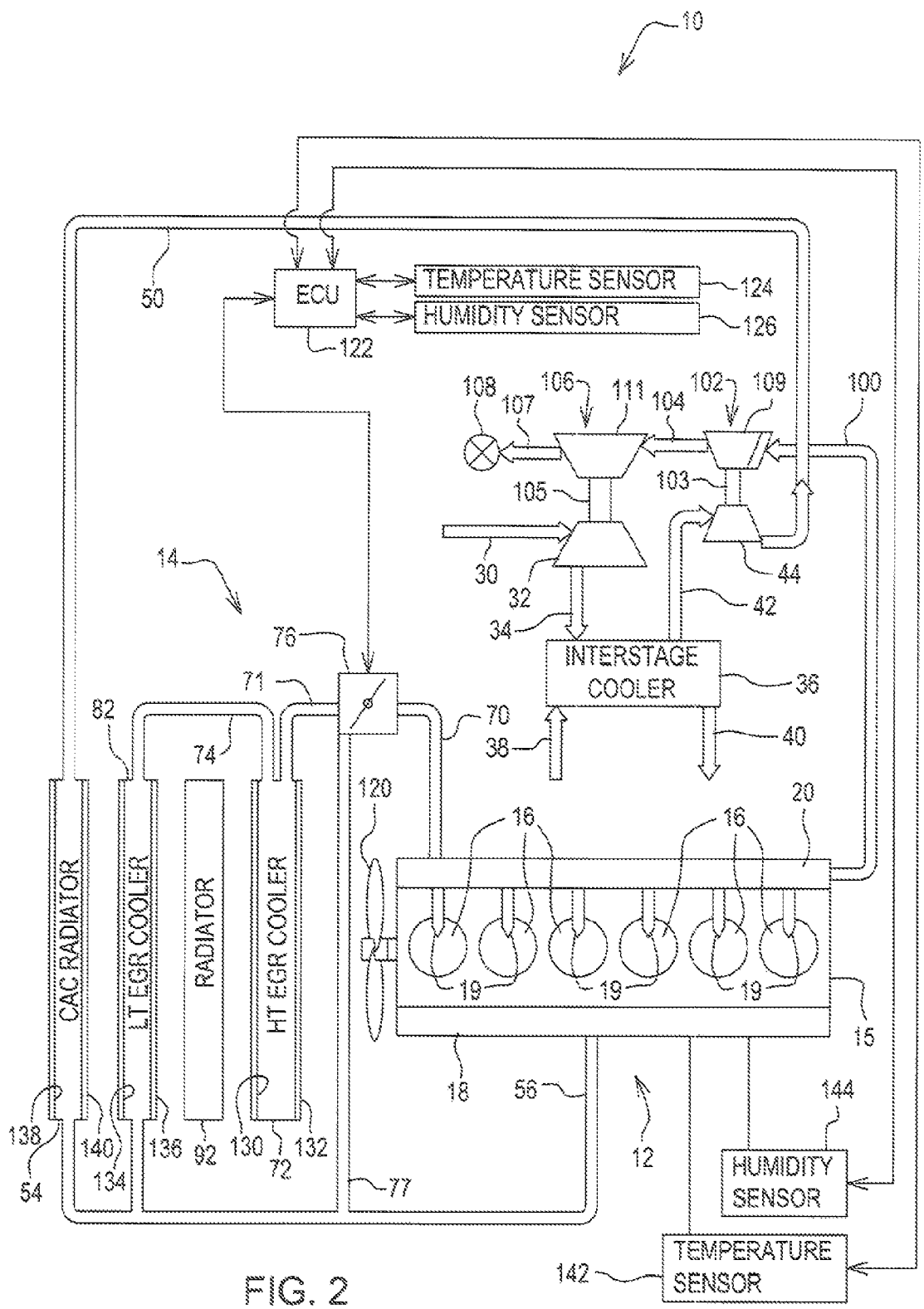
FIG. 2 is simplified schematic diagram a second power system.

Referring to FIG. 2, there is shown a second simplified schematic of a power system 11.

A difference between the first and second power systems 10, 11 is in the first power system 10, the bypass valve 76 is positioned downstream of the HT EGR cooler 72, while in the second power system 11, the bypass valve 76 is positioned upstream of the HT EGR cooler 72. In the second power system 11, the bypass valve 76 may be connected to the intake line 56 via a bypass line 77. Such placement of the bypass valve 76 and bypass line 77 may aid in cold weather starts, engine warm up, and condensation control.

Still, the second power system 11 has several components similar in structure and function as the first power system 10, as indicated by use of identical reference numbers where applicable.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A power system, comprising:
an internal combustion engine having an intake manifold, wherein the internal combustion engine receives intake gas and produces exhaust gas, a portion of the exhaust gas becomes recirculated exhaust gas;
a fan associated with the internal combustion engine and configured for providing an air flow;
an exhaust gas recirculation system (EGR system), comprising
an air cooled, high temperature exhaust gas recirculation cooler (HT EGR cooler) and an air cooled, low temperature exhaust gas recirculation cooler (LT EGR cooler), the HT EGR cooler configured for cooling the recirculated exhaust gas, wherein the HT EGR cooler is positioned downstream of the internal combustion engine, the HT EGR cooler has an inside and an outside, the inside of the HT EGR cooler is configured for receiving the recirculated exhaust gas, and the HT EGR cooler is positioned such that the air flow travels across the outside of the HT EGR cooler,
the LT EGR cooler configured for further cooling at least a portion of the recirculated exhaust gas, the LT EGR cooler is positioned downstream of the HT EGR cooler, the LT EGR cooler has an inside and an outside, the inside of the LT EGR cooler is configured for receiving the portion of the recirculated exhaust gas, and the LT EGR cooler is positioned such that the air flow travels across the outside of the LT EGR cooler;

a bypass valve positioned between the HT EGR cooler and the LT EGR cooler;
a bypass line connected to the bypass valve, wherein the bypass valve and the bypass line cooperate for allowing at least some of the recirculated exhaust gas to bypass, at times, the LT EGR cooler and to recirculate back to the internal combustion engine;
an electronic control unit (ECU);
a temperature sensor configured for providing a signal to the ECU indicative of a temperature of the ambient air; and
a humidity sensor configured for providing a signal to the ECU indicative of a humidity of the ambient air, wherein the ECU is configured for controlling the bypass valve in response to the signals provided by the temperature sensor and the humidity sensor.

2. The power system of claim 1, further comprising:
a variable geometry turbocharger (VGT) positioned upstream of the engine;
a fixed turbocharger positioned upstream of the VGT; and
an interstage cooler positioned between the fixed turbocharger and the VGT, wherein the interstage cooler is liquid cooled.

3. The power system of claim 2, further comprising a charge air cooler radiator (CAC radiator) configured for cooling the intake gas, wherein the CAC radiator is positioned downstream of the VGT, the CAC radiator has an inside and an outside, the inside of the CAC radiator is configured for receiving the intake gas, and the CAC radiator is positioned such that the air flow travels across the outside of the CAC radiator.

4. A power system, comprising:
an internal combustion engine having an intake manifold, wherein the internal combustion engine receives intake gas and produces exhaust gas, a portion of the exhaust gas becomes recirculated exhaust gas;
a fan associated with the internal combustion engine and configured for providing an air flow;
an exhaust gas recirculation system (EGR system), comprising an air cooled, high temperature exhaust gas recirculation cooler (HT EGR cooler) and an air cooled, low temperature exhaust gas recirculation cooler (LT EGR cooler), the HT EGR cooler configured for cooling the recirculated exhaust gas, wherein the HT EGR cooler is positioned downstream of the internal combustion engine, the HT EGR cooler has an inside and an outside, the inside of the HT EGR cooler is configured for receiving the recirculated exhaust gas, and the HT EGR cooler is positioned such that the air flow travels across the outside of the HT EGR cooler, the LT EGR cooler configured for further cooling at least a portion of the recirculated exhaust gas, the LT EGR cooler is positioned downstream of the HT EGR cooler, the LT EGR cooler has an inside and an outside, the inside of the LT EGR cooler is configured for receiving the portion of the recirculated exhaust gas, and the LT EGR cooler is positioned such that the air flow travels across the outside of the LT EGR cooler;
a bypass valve positioned between the HT EGR cooler and the LT EGR cooler;
a bypass line connected to the bypass valve, wherein the bypass valve and the bypass line cooperate for allowing at least some of the recirculated exhaust gas to bypass, at times, the HT EGR cooler and to recirculate back to the internal combustion engine;
an electronic control unit (ECU);
a temperature sensor configured for providing a signal to the ECU indicative of a temperature of the intake gas in the intake manifold; and
a humidity sensor configured for providing a signal to the ECU indicative of a humidity of the intake gas in the intake manifold, wherein the ECU is configured for controlling the bypass valve in response to the signals provided by the temperature sensor and the humidity sensor.

5. The power system of claim 4, further comprising:
a variable geometry turbocharger (VGT) positioned upstream of the engine;
a fixed turbocharger positioned upstream of the VGT; and
an interstage cooler positioned between the fixed turbocharger and the VGT, wherein the interstage cooler is liquid cooled.

6. The power system of claim 5, further comprising a charge air cooler radiator (CAC radiator) configured for cooling the intake gas, wherein the CAC radiator is positioned downstream of the VGT, the CAC radiator has an inside and an outside, the inside of the CAC radiator is configured for receiving the intake gas, and the CAC radiator is positioned such that the air flow travels across the outside of the CAC radiator.

7. A power system, comprising:
an internal combustion engine having an intake manifold, wherein the internal combustion engine receives intake gas and produces exhaust gas, a portion of the exhaust gas becomes recirculated exhaust gas;
a fan associated with the internal combustion engine and configured for providing an air flow;
an exhaust gas recirculation system (EGR system), comprising an air cooled, high temperature exhaust gas recirculation cooler (HT EGR cooler) and an air cooled, low temperature exhaust gas recirculation cooler (LT EGR cooler), the HT EGR cooler configured for cooling the recirculated exhaust gas, wherein the HT EGR cooler is positioned downstream of the internal combustion engine, the HT EGR cooler has an inside and an outside, the inside of the HT EGR cooler is configured for receiving the recirculated exhaust gas, and the HT EGR cooler is positioned such that the air flow travels across the outside of the HT EGR cooler, the LT EGR cooler configured for further cooling at least a portion of the recirculated exhaust gas, the LT EGR cooler is positioned downstream of the HT EGR cooler, the LT EGR cooler has an inside and an outside, the inside of the LT EGR cooler is configured for receiving the portion of the recirculated exhaust gas, and the LT EGR cooler is positioned such that the air flow travels across the outside of the LT EGR cooler;
a bypass valve positioned between the internal combustion engine and the HT EGR cooler;
a bypass line connected to the bypass valve, wherein the bypass valve and the bypass line cooperate for allowing at least some of the recirculated exhaust gas to bypass, at times, the HT EGR cooler and to recirculate back to the internal combustion engine;
an electronic control unit (ECU);
at least one of a first temperature sensor configured for providing a signal to the ECU indicative of a temperature of the ambient air, and a second temperature sensor configured for providing a signal to the ECU indicative of a temperature of the intake gas in the intake manifold; and
at least one of a first humidity sensor configured for providing a signal to the ECU indicative of a humidity of the ambient air, and a second humidity sensor configured for providing a signal to the ECU indicative of a humidity of the intake gas in the intake manifold, wherein the ECU is configured for controlling the bypass valve in response to the signals provided by at least one of the first and second temperature sensor and the first and second humidity sensor.

8. The power system of claim 7, further comprising;
a variable geometry turbocharger (VGT) positioned upstream of the engine;
a fixed turbocharger positioned upstream of the VGT; and
an interstage cooler positioned between the fixed turbocharger and the VGT, wherein the interstage cooler is liquid cooled.

9. The power system of claim 8, further comprising a charge air cooler radiator (CAC radiator) configured for cooling the intake gas, wherein the CAC radiator is positioned downstream of the VGT, the CAC radiator has an inside and an outside, the inside of the CAC radiator is configured for receiving the intake gas, and the CAC radiator is positioned such that the air flow travels across the outside of the CAC radiator.

* * * * *